United States Patent
Sun

(10) Patent No.: US 11,604,965 B2
(45) Date of Patent: Mar. 14, 2023

(54) PRIVATE DEEP LEARNING

(71) Applicant: salesforce.com, inc., San Francisco, CA (US)

(72) Inventor: Lichao Sun, Chicago, IL (US)

(73) Assignee: SALESFORCE.COM, INC., San Francisco, CA (US)

(*) Notice: Subject to any disclaimer, the term of this patent is extended or adjusted under 35 U.S.C. 154(b) by 807 days.

(21) Appl. No.: 16/546,751

(22) Filed: Aug. 21, 2019

(65) Prior Publication Data

US 2020/0364542 A1 Nov. 19, 2020

Related U.S. Application Data

(60) Provisional application No. 62/849,077, filed on May 16, 2019, provisional application No. 62/852,182, filed on May 23, 2019.

(51) Int. Cl.
- *G06N 3/04* (2006.01)
- *G06N 3/08* (2023.01)
- *G06N 3/008* (2023.01)

(52) U.S. Cl.
CPC ........... *G06N 3/0454* (2013.01); *G06N 3/008* (2013.01); *G06N 3/0481* (2013.01); *G06N 3/08* (2013.01)

(58) Field of Classification Search
CPC ...... G06N 3/054; G06N 3/008; G06N 3/0481; G06N 3/08; G06N 3/084
See application file for complete search history.

(56) References Cited

U.S. PATENT DOCUMENTS

| | | |
|---|---|---|
| 10,282,663 B2 | 5/2019 | Socher et al. |
| 10,346,721 B2 | 7/2019 | Albright et al. |
| 10,474,709 B2 | 11/2019 | Paulus |
| 10,521,465 B2 | 12/2019 | Paulus |
| 2016/0350653 A1 | 12/2016 | Socher et al. |
| 2017/0024645 A1 | 1/2017 | Socher et al. |
| 2017/0032280 A1 | 2/2017 | Socher |
| 2017/0140240 A1 | 5/2017 | Socher |
| 2018/0082171 A1 | 3/2018 | Merity et al. |
| 2018/0096219 A1 | 4/2018 | Socher |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |

(Continued)

OTHER PUBLICATIONS

Abadi et al., "Deep learning with differential privacy", In Proceedings of the 2016 ACM SIGSAC conference on computer and communications security, CCS '16, 2016, pp. 308-318.

(Continued)

*Primary Examiner* — Jamal Javaid
(74) *Attorney, Agent, or Firm* — Haynes and Boone, LLP

(57) ABSTRACT

A method for training parameters of a student model includes receiving one or more teacher models trained using sensitive data. Each teacher model includes one or more intermediate layers and a prediction layer coupled to the one or more intermediate layers. The method includes receiving, from the one or more teacher models, one or more intermediate layer outputs and one or more prediction layer outputs respectively based on public data. Student model training is performed to train parameters of the student model based on the intermediate layer outputs and prediction layer outputs of the one or more teacher models.

20 Claims, 9 Drawing Sheets

(56) References Cited

U.S. PATENT DOCUMENTS

| | | |
|---|---|---|
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0268287 A1 | 9/2018 | Johansen et al. |
| 2018/0268292 A1* | 9/2018 | Choi ................... G06K 9/6264 |
| 2018/0268298 A1 | 9/2018 | Johansen et al. |
| 2018/0300317 A1 | 10/2018 | Bradbury |
| 2018/0336198 A1 | 11/2018 | Zhong et al. |
| 2018/0336453 A1 | 11/2018 | Merity et al. |
| 2018/0349359 A1 | 12/2018 | McCann et al. |
| 2018/0373682 A1 | 12/2018 | McCann et al. |
| 2018/0373987 A1 | 12/2018 | Zhang et al. |
| 2019/0042878 A1* | 2/2019 | Sheller ................ G06K 9/6269 |
| 2019/0130206 A1 | 5/2019 | Trott et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0130897 A1 | 5/2019 | Zhou et al. |
| 2019/0149834 A1 | 5/2019 | Zhou et al. |
| 2019/0188568 A1 | 6/2019 | Keskar et al. |
| 2019/0213482 A1 | 7/2019 | Socher et al. |
| 2019/0251168 A1 | 8/2019 | McCann et al. |
| 2019/0251431 A1 | 8/2019 | Keskar et al. |
| 2019/0258714 A1 | 8/2019 | Zhong et al. |
| 2019/0258939 A1 | 8/2019 | Min et al. |
| 2019/0286073 A1 | 9/2019 | Hosseini-Asl et al. |
| 2019/0295530 A1 | 9/2019 | Hosseini-Asl et al. |
| 2019/0362020 A1 | 11/2019 | Paulus et al. |

OTHER PUBLICATIONS

Agarwal et al., "cpSGD: Communication-efficient and differentially-private distributed SGD", In Advances in neural information processing systems, 2018, pp. 7564-7575.

Alipanahi et al., Predicting the sequence specificities of DNA- and RNA-binding proteins by deep learning, Nature biotechnology, 2015, pp. 831-838.

Bassily et al., "Differentially private empirical risk minimization: Efficient algorithms and tight error bounds", arXiv preprint arXiv:1405.7085, 2014.

Beimel et al., "Bounds on the sample complexity for private learning and private data release", Machine Learning, 2014, pp. 401-437.

Chaudhuri et al., "Differentially private empirical risk minimization", Journal of machine learning research, 2011, pp. 1069-1109.

Devlin et al., "Bert: Pre-training of deep bidirectional transformers for language understanding", arXiv preprint arXiv:1810.04805, 2018.

Dwork et al., "Our data, Ourselves: Privacy via distributed noise generation", Springer berlin heidelberg, 2006, pp. 486-503.

Dwork, "A firm foundation for private data analysis", Communications of the ACM, 2011, pp. 86-95.

Dwork, "Differential privacy", 2011, pp. 338-340.

Gong et al., "Deepscan: Exploiting deep learning for malicious account detection in location-based social networks", IEEE Communications magazine, 2018, pp. 21-27.

Hamm et al., "Learning privately from multiparty data", In international conference on machine learning, 2016, pp. 555-563.

He et al., "Deep residual learning for image recognition", In proceedings of the IEEE conference on computer vision and pattern recognition, 2016, pp. 770-778.

Hinton et al., "Distilling the knowledge in a neural network", In advances in neural information processing systems deep learning workshop, NIPS '14. 2014.

Jordon et al., "Pate-gan: Generating synthetic data with differential privacy guarantees". 2018.

Krizhevsky et al., "Learning multiple layers of features from tiny images", 2009.

Laine et al., "Temporal ensembling for semi-supervised learning", In 5th international conference on learning representations, ICLR'17, 2017.

Lecun et al., "Gradient-based learning applied to document recognition", Proceedings of the IEEE, 1998, pp. 2278-2324.

Ma et al., "Pdlm: Privacy-preserving deep learning model on cloud with multiple keys", IEEE Transactions on services computing, 2018.

McMahan et al., "Learning differentially private recurrent language models", arXiv preprint arXiv:1710.06963, 2017.

Michie et al., "Machine learning, Neural and statistical classification," 1994.

Netzer et al., "Reading digits in natural images with unsupervised feature learning", In Proceedings of the 24th international conference on neural information processing systems, NIPS '11, 2011, pp. 1-9.

Nissim et al., "Smooth sensitivity and sampling in private data analysis", In Proceedings of the thirty-ninth annual ACM symposium on Theory of computing, 2007, pp. 75-84.

Papernot et al., "Scalable private learning with PATE," In 6th international conference on learning representations, ICLR'18, 2018.

Papernot et al., "Semi-supervised knowledge transfer for deep learning from private training data", In 5th international conference on learning representations (ICLR), 2017.

Park et al., "Adversarial dropout for supervised and semi-supervised learning", arXiv:1707.03631, 2017.

Pathak et al., "Multiparty differential privacy via aggregation of locally trained classifiers", In advances in neural information processing systems, 2010, pp. 1876-1884.

Samangouei et al., "Defense-gan: Protecting classifiers against adversarial attacks using generative models", arXiv preprint arXiv:1805.06605, 2018.

Silver et al., "Mastering the game of go without human knowledge", Nature, 2017, pp. 354-359.

Song et al., "Stochastic gradient descent with differentially private updates", In 2013 IEEE global conference on signal and information processing, IEEE, 2013, pp. 245-248.

Yan, "Mobile phone behavior", Cambridge university press, 2017.

* cited by examiner

350

Algorithm 2: Function Privacy Sanitize

Input: Batch loss $\mathcal{L}^{(i)}$.
Parameter : Noise scale $\sigma$; Bound threshold $B$.

1. $\bar{\mathcal{L}}^{(i)} \leftarrow \mathcal{L}^{(i)} / \max\left(1, \frac{\|\mathcal{L}^{(i)}\|_2}{B}\right)$;
2. $\tilde{\mathcal{L}}^{(i)} \leftarrow \bar{\mathcal{L}}^{(i)} + \mathcal{N}(0, \sigma^2 B^2 \mathbf{I})$;

Output: Sanitized batch loss $\tilde{\mathcal{L}}^{(i)}$.

Algorithm 1: Private Deep Teacher-Student Learning Model

Parameter: Teacher models $T$. Hint learning epochs $T_h$. Distillation learning epochs $T_k$. Batch size $S$ of hint learning and distillation learning; threshold bound $D$.

1: for $epoch = 1$ to $T_h$ do
2:   for $i = 0$ to $|x_p|/S$ do
3:     Sample a batch $x_p^{(i)}$ of size $S$ from $x_p$;
4:     Compute hint loss $\mathcal{L}_H^{(i)}$ over $x_p^{(i)}$ by Eq. (1) for each teacher $T$;
5:     Bound $\mathcal{L}_H^{(i)}$ by Eq. (3) for each teacher;
6:     Compute aggregated hint loss $\mathcal{L}_H^{(i)}$ by averaging bounded hint loss $\mathcal{L}_H^{(i)}$ of all teachers;
7:     Compute perturbed hint loss $\tilde{\mathcal{L}}_H^{(i)}$ by Eq. (4);
8:     Backpropagate by $\tilde{\mathcal{L}}_H^{(i)}$ to update $\Theta_s$;

9: for $epoch = 1$ to $T_k$ do
10:   for $i = 0$ to $|x_p|/S$ do
11:     Sample a batch $x_p^{(i)}$ of size $S$ from $x_p$;
12:     Compute knowledge distillation loss $\mathcal{L}_K^{(i)}$ over $x_p^{(i)}$ by Eq. (2) for each teacher $T$;
13:     Bound $\mathcal{L}_K^{(i)}$ by Eq. (3) for each teacher;
14:     Compute aggregated distillation loss $\mathcal{L}_K^{(i)}$ by averaging bounded distillation loss $\mathcal{L}_K^{(i)}$ of all teachers;
15:     Compute perturbed distillation loss $\tilde{\mathcal{L}}_K^{(i)}$ by Eq. (4);
16:     Backpropagate by $\tilde{\mathcal{L}}_K^{(i)}$ to update $\Theta_s$;

| Dataset | CIFAR 10 | | MNIST | | SVHN | |
|---|---|---|---|---|---|---|
| Model | Accuracy | Privacy Budget | Accuracy | Privacy Budget | Accuracy | Privacy Budget |
| DP-SGD | 78.00% | 8.00 | 97.00% | 8.00 | - | - |
| PATE-LNMax | - | - | 98.10% | 8.03 | 90.77% | 8.19 |
| PATE-GNMax | - | - | 98.50% | 1.97 | 91.60% | 4.96 |
| PET-DL (n = 2) | 74.33% | 6.90 | 99.12% | 1.43 | 94.07% | 4.51 |
| PET-DL (n = 4) | 76.81% | 5.48 | 99.33% | 1.21 | 95.55% | 3.96 |
| PET-DL - weighted | 77.31% | 4.83 | 99.37% | 1.02 | 95.43% | 2.73 |

FIG. 7

| Dataset | CIFAR 10 | | MNIST | | SVHN | |
|---|---|---|---|---|---|---|
| Model | Accuracy | Privacy Budget | Accuracy | Privacy Budget | Accuracy | Privacy Budget |
| PET-DL (n = 10) | 62.31% | 2.33 | 97.26% | 1.17 | 90.31% | 2.51 |
| PET-DL weighted | 71.3% | 2.23 | 98.69% | 0.91 | 91.15% | 2.12 |

PRIVATE DEEP LEARNING

RELATED APPLICATIONS

This application claims priority to U.S. Provisional Patent Application No. 62/849,077 filed May 16, 2019 and U.S. Provisional Patent Application No. 62/852,182 filed May 23, 2019, each of which are incorporated by reference herein in its entirety.

TECHNICAL FIELD

The present disclosure relates generally to neural networks and more specifically to training neural networks with training data having sensitive information.

BACKGROUND

Privacy preserving deep learning is crucial for deploy deep neural network based solutions, especially when the neural network model is trained with and applied to data that contains sensitive information. However, typically, privacy preserving methods lead to undesirable performance degradation.

Accordingly, it would be advantageous to develop systems and methods for privacy preserving deep learning with data that contains sensitive information.

BRIEF DESCRIPTION OF THE DRAWINGS

FIG. 4B illustrates pseudocode of an algorithm of performing privacy sanitization for a neural network model according to some embodiments.

FIG. 6 is a table illustrating the performance of a private deep teach-student learning system with various configurations according to some embodiments.

FIG. 7 is a table illustrating the performance of a private deep teach-student learning system with various configurations using unbalanced datasets according to some embodiments.

In the figures, elements having the same designations have the same or similar functions.

DETAILED DESCRIPTION

Figure 1:
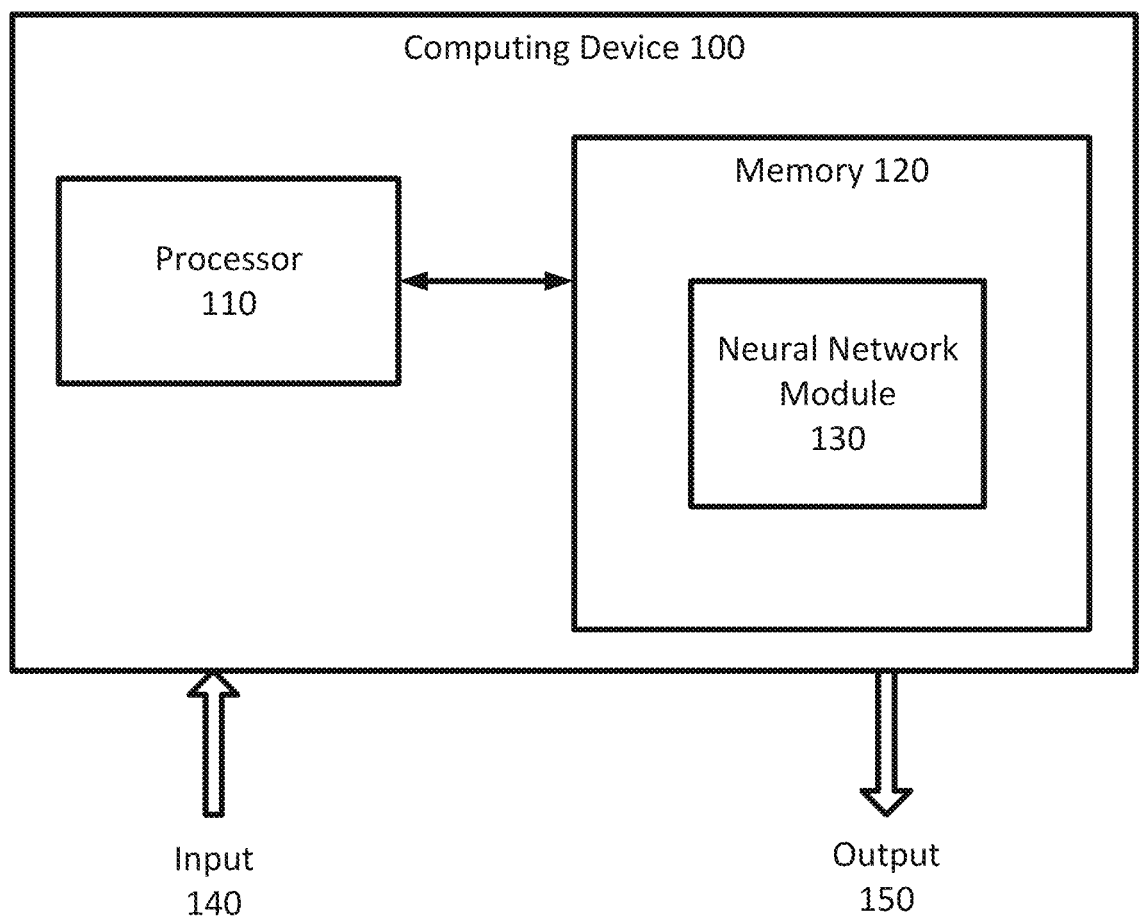
FIG. 1 is a simplified diagram of a computing device according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a neural network module 130 that may be used to implement and/or emulate the neural network systems and models described further herein and/or to implement any of the methods described further herein. In some examples, neural network module 130 may be used to translate structured text. In some examples, neural network module 130 may also handle the iterative training and/or evaluation of a translation system or model used to translate the structured text. In some examples, memory 120 may include non-transitory, tangible, machine readable media that includes executable code that when run by one or more processors (e.g., processor 110) may cause the one or more processors to perform the counting methods described in further detail herein. In some examples, neural network module 130 may be implemented using hardware, software, and/or a combination of hardware and software. As shown, computing device 100 receives input 140, which is provided to neural network module 130, neural network module 130 then generates output 150.

Figure 2A:
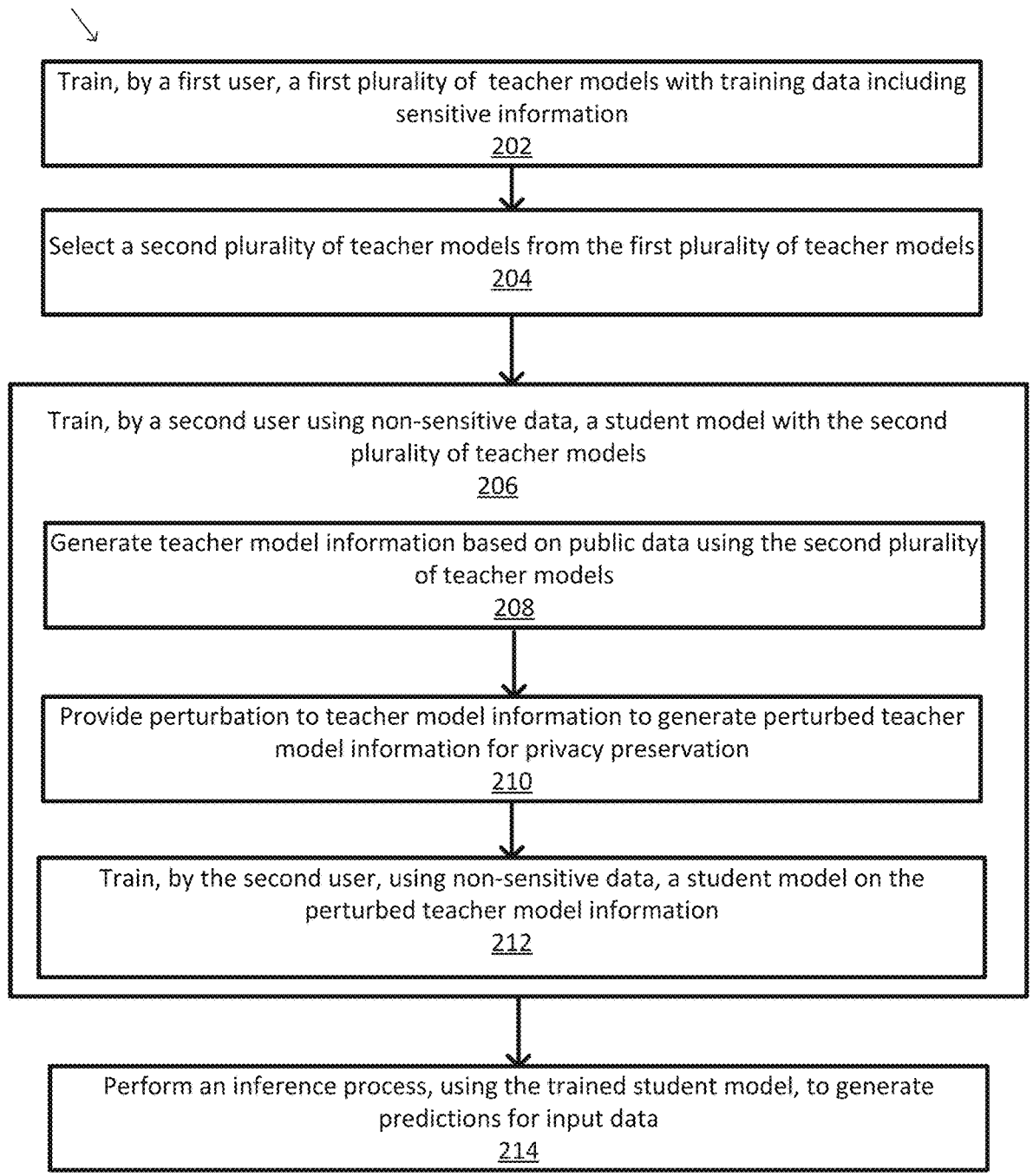
FIG. 2A is a simplified diagram of a method of training a private deep teach-student learning model and deploying the trained model according to some embodiments.

FIG. 2A is a simplified diagram of a method 200 of training a neural network model using batches including sensitive data according to some embodiments. One or more of the processes 202-212 of method 200 may be implemented, at least in part, in the form of executable code stored on non-transitory, tangible, machine-readable media that when run by one or more processors may cause the one or more processors to perform one or more of the processes 202-212. In some embodiments, method 200 may correspond to the method used by neural network module 130 to perform training using data including sensitive information for various tasks (e.g., diagnoses and prediction on medical diseases, image recognition, natural language processing, etc.). In various embodiments, sensitive data may only be used as training dataset during the training process of the teacher models (e.g., at block 202), and are not used as training dataset during the training process of the student models (e.g., at block 206) using the trained teacher models. Public data or non-sensitive data may be used to as training dataset during the training process of the student models (e.g., at block 206).

Figure 2B:
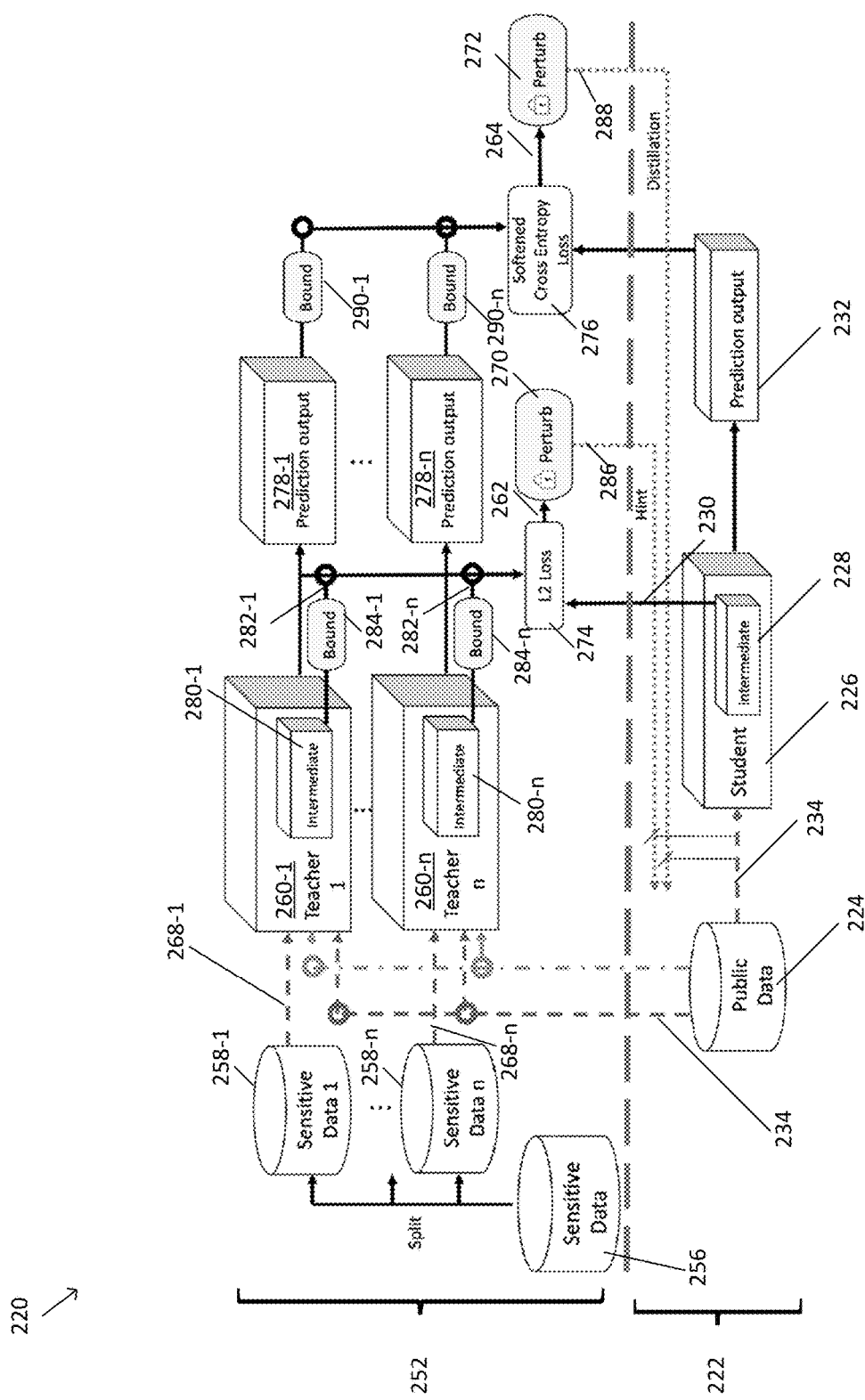
FIG. 2B is a diagram of a private deep teach-student learning system.

FIG. 2B is an example private deep teacher-student learning system 220 that may be used to implement the method 200. The private deep teacher-student learning system 220 implements private deep learning with teacher ensembles (also referred to as PET-DL below). The private deep teacher-student learning system 220 includes a public section 222 that may be accessible by the adversary and a sensitive section 252 that is not accessible by adversary. The sensitive section 252 includes sensitive data 256 (e.g., stored in one or more databases) only accessible by a first user or a first user group including one or more users, but is not accessible by the adversary or a second user or a second user group including one or more users. The sensitive data may include individual's personal contacts, private photographs, correspondence, medical records, genetic sequences, etc. The sensitive data 256 may be split into n sensitive datasets 258-1 through 258-n, where n is an integer equal to or greater than 1. In some embodiments, the n sensitive datasets 258-1 through 258-n are subsets of the sensitive data 256 that may include overlap sensitive data samples. In alternative embodiments, the n sensitive datasets 258-1 through 258-n are disjoint subsets without overlap sensitive data samples. The n sensitive datasets 258-1 through 258-n are subsets that may be used to train teacher neural network models 260-1 through 260-n (also referred to as teacher models 260-1 through 260-n or teachers 260-1 through 260-n) respectively.

As shown in FIG. 2B, the public section 222 of the private deep teacher-student learning system 220 includes public data 224 (e.g., stored in one or more databases) accessible by both the first user (and/or the first user group) and the second user (and/or the second user group). The public data 224 may be used to train the student neural network model 226 (also referred to as student model 226 or student 226. While only a single student 226 is illustrated in FIG. 2B, the public section 222 may include any suitable number of student models.

As shown in FIG. 2A, the method 200 begins at block 202, where a first user (e.g., owner of sensitive data) trains a first plurality of teacher models using training data including sensitive information. In the system 220, a first user trains a plurality of teacher models 260-1 through 260-n using training data including sensitive data 256. In an example, teacher models 260-1 through 260-n are trained using sensitive datasets 268-1 through 268-n (e.g., from sensitive data subjects 258-1 through 258-n) respectively.

The method 200 may proceed to block 204, where a second plurality of teacher models are selected from the first plurality of teacher models. The number and types of selected teachers may be determined based on required privacy guarantee levels (e.g., high, medium, low), accuracy requirements, corresponding training dataset types, etc.

The method 200 may proceed to block 206, where a student model is trained using non-sensitive data (e.g., public data 224) with the second plurality of teacher models. In some embodiments, the student model is trained by the second user (e.g., different from the first user). In the system 220, the second user may have access to the public section 222 and components thereof (e.g., public data 224 and student model 226), but do not have access to the sensitive section 252 and components thereof (e.g., sensitivity data 256 and teachers 260-1 through 260-n). Information related to the teacher models (e.g., data, loss, gradients, etc.) is sensitive, and may raise privacy concerns for data providers. As described in detail below, block 206 may include blocks 208, 210, and 212, where perturbations with privacy guarantees are applied the knowledge/information from the teacher models, and the student model is trained using the perturbed teacher model knowledge. As such, no adversary can recover the original sensitive information even if the adversary has full access of the student model and/or the perturbed teacher model knowledge, and privacy is preserved.

Alternatively, the student model is trained by the first user that trained the teacher models.

At block 208, teacher model information is generated based on public data using selected teacher models. In the system 220, public data 224 is provided to the teacher models (e.g., one or more of teacher models 260-1 through 260-n) as input data samples to generate teacher model information corresponding to the received public data samples. The teacher model information may include outputs from various layers of the teacher models. For example, the teacher model information includes intermediate representations 282-1 through 282-n from intermediate layers 280-1 through 280-n of the teacher models 260-1 through 260-n. For further example, the teacher model information includes prediction outputs 278-1 through 278-n from prediction layers of the teacher models 260-1 through 260-n.

The teacher model information may also include information (e.g., loss, gradients, etc.) generated based on teacher model outputs. For example, the teacher model information includes loss information 262 generated based on the intermediate representations 282-1 through 282-n from the teacher models using the public data samples. In the system 220, loss information 262 is generated using a loss function unit 274 (e.g., using an L2 loss function). For example, loss information 262 includes the loss between intermediate representations from the teacher models and the intermediate representations 230 from the intermediate layer 228 of the student model 226 generated using the same public data samples 234 by the student model 226. In some embodiments, the loss units 274 may include bound units that apply a threshold to the losses associated with the teacher models respectively, such that the loss associated with each teacher model is bounded. Alternatively, in some embodiments, bound units 284-1 through 284-n may be used to apply a threshold to bound the values of the intermediate representations from the teacher models, such that the loss associated with each teacher model is bounded.

For further example, the teacher model information includes loss information 264 generated based on the prediction outputs 271-1 through 278-n of the teacher models using the public data samples. In the system 220, loss information 264 is generated using a loss function unit 276 (e.g., using a softened cross entropy loss function), which may be different from the loss function of the loss function unit 274. For example, loss information 264 includes the loss between the prediction outputs 271-1 through 278-n of the teacher models using the public data samples and the prediction output 230 from the prediction layer of the student model 226 generated using the same public data samples 234 by the student model 226. In some embodiments, the loss units 276 may include bound units that apply a threshold to the losses associated with the teacher models respectively, such that the loss associated with each teacher model is bounded. Alternatively, in some embodiments, bound units 290-1 through 290-n may be used to apply a threshold to bound the values of the prediction outputs from the teacher models, such that the loss associated with each teacher model is bounded.

At block 210, perturbation (e.g., random noise perturbation) is provided to the teacher model information to generate perturbed teacher model information for privacy preservation. By perturbing sensitive information of the teacher models (e.g., by adding random noise during the training process of the student model), the student model (e.g., student model 224) may learn the knowledge from the teacher models with privacy guarantee. The teacher model information may include loss information 262, loss information 264, any other suitable teacher model information, and/or a combination thereof. In the system 220, perturbation unit 270 applies perturbation (e.g., a random Gaussian or gamma noise perturbation) to loss information 262 to generate perturbed teacher model information 286 (also referred to as perturbed loss information 286). Perturbation unit 272 applies perturbation (e.g., a random Gaussian noise) to loss information 264 to generate perturbed teacher model information 288 (also referred to as perturbed loss information 288). In various embodiments, different perturbations (e.g., noise with different scale and/or distribution) may be applied by perturbation units 270 and 272.

At block 212, the student model is trained by the second user (e.g., different from the first user) using non-sensitive data including public data samples 234 and the perturbed information (e.g., perturbed teacher outputs 270 and 272) from the teacher models. The second user may not have access to the sensitive data 256. In the system 220, the student model including its trainable parameters may be trained using a multi-layer knowledge transfer via deep neural networks. The multi-layer knowledge transfer may include for example, intermediate layer knowledge transfer using hint learning, prediction layer knowledge transfer using distillation learning, any other suitable types of learning, and/or a combination thereof.

In the system 220, at block 212, the perturbed teacher model information (e.g., perturbed loss information 286 and 288) are used to train the student model 226 using iterative optimization algorithms. For example, gradient descent optimizations (e.g., backpropagation with the corresponding loss functions) are used. In an example, the student model 226 may be first trained using hint learning (e.g., using backpropagation with loss function 274), followed by distillation learning (e.g., using backpropagation with loss function 274).

At block 214, an inference process is performed using the trained student model to generate an output (e.g., prediction) for input data. In an example, only the trained student model is deployed on another processor without the teacher models. The inference process may be performed by a third user (e.g., a user that does not have access to the sensitive section 252 of the system 220) to generate an output (e.g., prediction) for input data. The inference process does not use the sensitive section 252 of the system 220, including the sensitive data 256 and teacher models 260-1 through 260-n. By using the perturbed teacher model information to train the student model 226, the privacy preservation is realized. In other words, even if a user has access to the deployed trained student model and/or trained parameters thereof, that user may not recover the sensitive data 256 used to train the teacher models.

In various embodiments, the multi-layer knowledge transfer provides the advantage of utilizing the rich information (e.g., from different layers) of the teacher neural network models. Specifically, the teacher neural network models 260-1 through 260-n provide rich information because of the complex structure (e.g., including one or more hidden layers and prediction layer) of each teacher neural network model. By using the multi-layer knowledge transfer, for each teacher (e.g., that receives an unseen public data sample x from the query of the student), the teacher may transfer one or more types (e.g., intermediate layer knowledge, prediction layer knowledge, any other types of knowledge, and/or a combination thereof) to the student.

In the description below, hint learning is used for intermediate layer knowledge transfer, and distillation learning is used for prediction layer knowledge transfer as an example. It is noted that various learning techniques (e.g., hint learning, distillation, active learning, semi-supervised learning, generative adversary network (GAN) framework, etc.) may be used in each of the different types of knowledge transfers in the multi-layer knowledge transfer.

Figure 3A:
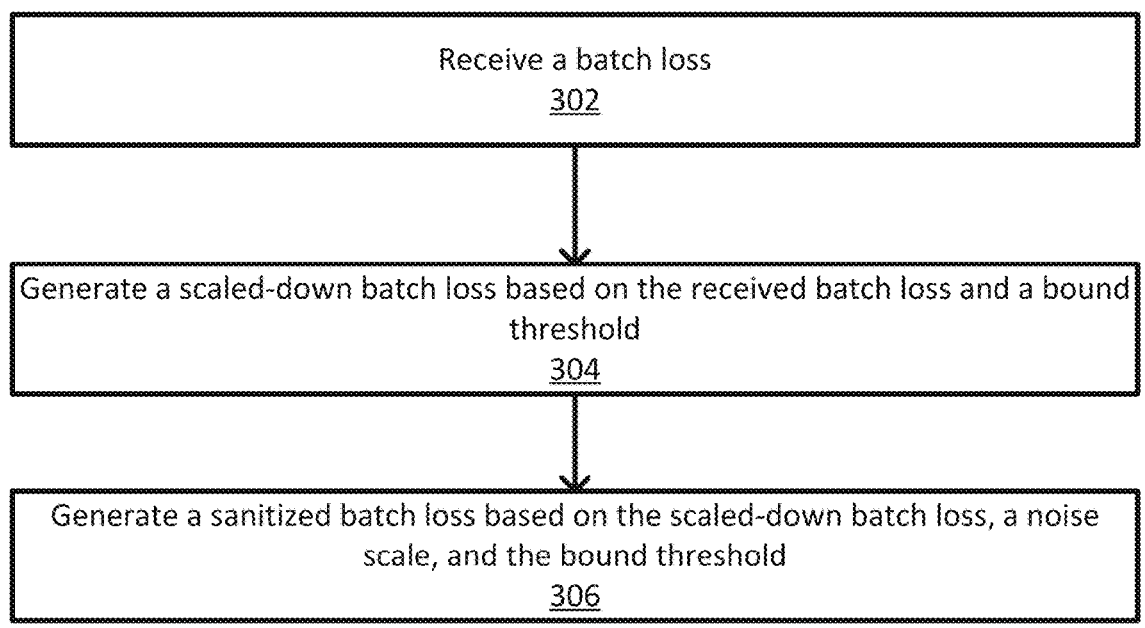
FIG. 3A is a simplified diagram of a method of performing privacy sanitization according to some embodiments.
Figure 3B:
FIG. 3B illustrates pseudocode of an algorithm of performing privacy sanitization for a neural network model according to some embodiments.

FIG. 3A is a simplified diagram of a method 300 of perturbing information with noise to generate sanitized batch loss from a batch loss including sensitive information, and FIG. 3B is an example pseudocode algorithm 350 for implementing method 300. In some embodiments, block 210 of method 200 of FIG. 2A may use method 300 for generating perturbed teacher model information. Specifically, the method 300 describes generating a sanitized batch loss for training a neural network model (e.g., student model) using batch loss including sensitive data (e.g., batch loss generated using the teacher models) according to some embodiments. One or more of the blocks (processes) 302-306 of method 300 may be implemented, at least in part, in the form of executable code stored on non-transitory, tangible, machine-readable media that when run by one or more processors may cause the one or more processors to perform one or more of the processes 302-306. In some embodiments, method 300 may correspond to the method used by neural network module 130 to perform training using data including sensitive information for various tasks (e.g., diagnoses and prediction on medical diseases, image recognition, natural language processing, etc.).

The method 300 starts at a process 302, during a training process for a neural network model using a particular batch, a batch loss (e.g., computed based on a loss function) is received. As shown in the algorithm 350 of FIG. 3B, a batch loss $\bar{\mathcal{L}}^{(i)}$ for the $i^{th}$ batch of training data is received. In some examples, the batch loss $\bar{\mathcal{L}}^{(i)}$ includes sensitive information (e.g., from teacher models trained using sensitive data). Also, at block 350, the processor may also determine a noise scale σ and a bound threshold B. In various embodiments, the noise scale and bound threshold may be determined based on the privacy guarantee requirements (e.g., privacy budget), the number of teachers, the neural network performance (e.g., accuracy, speed, etc.) requirements, the types of knowledge learning (e.g., hint learning using intermediate layer outputs, distillation learning using prediction layer outputs, etc.), and/or any other neural network system requirements and conditions.

At a process 304, a scaled-down batch loss (bounded loss) is generated based on the received batch loss and a bound threshold. As shown in algorithm 350 of FIG. 3B, a scaled down batch loss $\tilde{\mathcal{L}}^{(i)}$ is generated by applying a bound threshold B to the batch loss $\bar{\mathcal{L}}^{(i)}$. An example scaling down method is provided at line 1 of algorithm 350 as follows:

$$\tilde{\mathcal{L}}^{(i)} = \mathcal{L}^{(i)} / \max\left(1, \frac{\|\mathcal{L}^{(i)}\|_2}{B}\right). \qquad (3)$$

Specifically, in the example, the max value of $\|\bar{\mathcal{L}}^{(i)}\|_2$ for each teacher is clipped within a given bound B. In cases where $\|\bar{\mathcal{L}}^{(i)}\|_2$ is less than or equal to B, scaled down batch loss $\bar{\mathcal{L}}^{(i)}$ is the same as batch loss $\bar{\mathcal{L}}^{(i)}$. In cases where $\|\bar{\mathcal{L}}^{(i)}\|_2$ is greater than B, scaled down batch loss $\bar{\mathcal{L}}^{(i)}$ is generated by scaling down batch loss $\bar{\mathcal{L}}^{(i)}$ by $$\frac{\|\mathcal{L}^{(i)}\|_2}{B}.$$

At a process 306, a sanitized batch loss (a perturbed batch loss) is generated based on the scaled-down batch loss, the noise scale, and the bound threshold. As shown in algorithm 350 of FIG. 3B, a sanitized batch loss $\tilde{\mathcal{L}}^{(i)}$ for each teacher is generated by applying a noise to the scaled down batch loss $\bar{\mathcal{L}}^{(i)}$ for that particular teacher. An example scaling down method is provided at line 1 of algorithm 350 as follows:

$$\tilde{\mathcal{L}}^{(i)} = \bar{\mathcal{L}}^{(i)} + \mathcal{N}(0, \sigma^2 B^2 I), \tag{4.1}$$

where N is a random variable obeying the Gaussian distribution with mean 0 and standard deviation $\sigma^2 B^2 I$.

Additionally, or alternatively, a noise may be applied to an aggregated loss of scaled down losses of all teachers as follows:

$$\tilde{\mathcal{L}}^{(i)} \leftarrow \hat{\mathcal{L}}^{(i)} + \mathcal{N}(0, \sigma^2 B^2 I), \tag{4.2}$$

wherein $\hat{\mathcal{L}}^{(i)}$ an aggregated loss generated based on bounded losses $\bar{\mathcal{L}}^{(i)}$ of all teachers, and N is a random variable obeying the Gaussian distribution with mean 0 and standard deviation $\sigma^2 B^2 I$.

In some embodiments, noise is only applied to individual teacher's bounded loss, but is not applied to the aggregated loss. In some embodiments, noise is not applied to individual teacher's bounded loss, and is only applied to the aggregated loss. In some embodiments, noise is applied to both individual teacher's bounded loss and the aggregated loss. In those embodiments, noise with the same noise scale or different noise scales may be used for the individual teacher's bounded loss and the aggregated loss respectively.

In some embodiments, aggregated loss $\hat{\mathcal{L}}^{(i)}$ is a direct average of all teachers' bounded loss $\bar{\mathcal{L}}^{(i)}$. In alternative embodiments, a PET-DL with a weighted teacher ensemble scheme (also referred to as PET-DL-weighted) is implemented. In those embodiments, aggregated loss $\hat{\mathcal{L}}^{(i)}$ is a weighted average by applying different weights to different teachers' bounded losses, where the weights may be determined based on additional information of each teacher (e.g., confidence score). It is noted that in some embodiments, the privacy loss of each query using the weighted average is the same as that of using direct average aggregation. Such a PET-DL-weighted system may improve performance where each teacher is trained on different or biased datasets. For example, PET-DL-weighted may be more robust than simple non-weighted PET-DL when the training data for different teachers are biased.

Figure 4A:
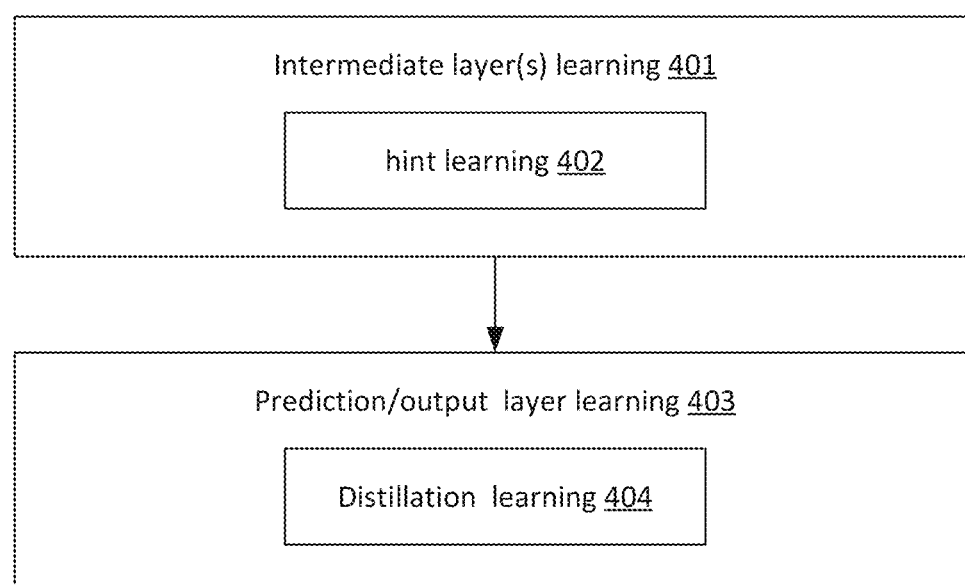
FIG. 4A is a simplified diagram of a method of training a private deep teach-student learning model or a portion thereof according to some embodiments.

FIG. 4A is a simplified diagram of a method 400 of training a student model using multi-layer knowledge transfer from teacher models using private hint learning and/or distillation learning; and FIG. 4B is an example pseudocode algorithm for implementing method 400. In some embodiments, block 206 of method 200 of FIG. 2A may use method 400 to train the student model. While the method 400 of FIG. 4A illustrates knowledge transfers from intermediate layers and prediction/output layer of the teacher models, it may include any suitable knowledge transfer from suitable structures of the teacher models. Furthermore, while hint learning is used as an example for intermediate layer knowledge transfer and distillation learning is used as an example for prediction layer knowledge transfer, any suitable learning techniques may be used for different types of knowledge transfer respectively.

The method 400 may begin at block 401, where intermediate layer knowledge transfer is performed. Block 401 may include block 402, which performs private hint learning for intermediate layer knowledge transfer in the teacher-student deep learning model. Private hint learning may be used to transfer the knowledge including the output (intermediate representation) of one or more intermediate layers of the teacher models. The intermediate representations may include one or more hidden layers of the teacher model or low-rank representations on the original sensitive dataset. These intermediate representations from the teacher models contain valuable information, which may be used to guide the training of the student model as a hint. For example, by using hint learning, intermediate representation and low rank representations (e.g., feature representation) of the student model may be trained to be similar to the intermediate representation and low rank representations the teacher models. As such, the training process for transferring the knowledge of the outputs of one or more selected intermediate representations is referred to as hint learning, intermediate layer learning, or intermediate layer knowledge transfer.

In an example, in the system 220 of FIG. 2B, during private hint learning 402, intermediate representations of the teacher models (e.g., one or more of intermediate representation 282-1 through 282-n from intermediate layers 280-1 through 280-n) are sent to a loss function 274. Intermediate representation 230 from intermediate layer(s) 228 of the student model 226 is also sent to the loss function 274. The student model 226 (e.g., including its trainable parameters $\Theta_s$) is trained by minimizing the loss function 274, where the intermediate outputs 230 of the student model 226 may mimic the corresponding intermediate representations of the teachers (e.g., one or more of teachers 260-1 through 260-n). In an example, the loss function 275 includes an L2 loss function that minimizes the error which is the sum of the all the squared differences between the true value (e.g., intermediate representations of the student model) and the predicted value (e.g., intermediate representations of the teacher models). An example L2 loss function is provided as follows:

$$\bar{\mathcal{L}}_H(x_p, o_h; \Theta_s) = \tfrac{1}{2}\|h(x_p; \Theta_s) - o_h\|_2^2, \tag{1}$$

where $x_p$ denotes public samples 234 (e.g., from the public dataset 224), $h(x_p; \Theta_s)$ represents the intermediate outputs 230 of the intermediate layer 228 of the student model 226 with parameters $\Theta_s$, and $o_h$ is the teachers' intermediate layer outputs 282-1 through 282-n over public samples 234 (e.g., from public dataset 224).

At block 403, prediction/output layer knowledge transfer is performed. Block 403 may include block 404, where distillation learning for prediction layer knowledge transfer is performed to train the student model. In the system 220 of FIG. 2B, the student model 226 is trained based on optimization using knowledge distillation loss. An example of knowledge distillation loss is provided as follows:

$$\bar{\mathcal{L}}_K(x_p, P^t; \Theta_s) = \mathcal{C}(P^s, P^t; \Theta_s). \tag{2}$$

where $x_p$ denotes public samples 234 (e.g., from the public dataset 224), $\Theta_s$ represents the trainable parameters of the student model 226, C denotes the cross-entropy loss. $P^s$ denotes the student's soften probability over the public samples $x_p$ and may be defined as follows:

$$P^s = \text{softmax}(c^s),$$

where $c^s$ represents logits of the student model.

In equation (2), $P^t$ denotes the aggregated teachers' soften probability, which is an example of the prediction/output layer knowledge from the teachers. In an example, aggregated teachers' soften probability $P^t$ may be computed as follows:

$$P^t = 1/N \Sigma_{i=1}^{N} P_i^t,$$

where N is the number of teachers, and softened probability $P_i^t$ of the i-th teacher is regarded as the knowledge as follows:

$$P_i^t = \text{softmax}(c_i^t/\tau),$$

where $c_i^t$ denote the output of the last hidden layer of the i-th teacher, and $\tau$ is a temperature parameter. In an example, setting $\tau$ greater than 1 may increase the probabilities of the classes of the samples whose normal values are near zero, and where setting $\tau$ equal to 1 does not change those probabilities. As such, by using the temperature parameter $\tau$, the relationship between various classes in embodied as knowledge in the soften probability $P_i^t$.

In some embodiments, aggregated teachers' soften probability $P^t$ may be computed as weighted average based on a weighting scheme. For example, the weights may be determined based on additional information of each teacher (e.g., confidence score). In an example where the highest probability (e.g., softmax probability) among different classes of samples is used as the confidence score, the aggregated teachers' soften probability $P^t$ may be determined as follows:

$$P^t = \sum_{i=1}^{N} \omega_i P_i^t,$$

$$\omega_i = \max_{l \in C} \text{softmax}(c_i^t)l.$$

Referring to FIG. 4B, algorithm 450 is an example for implementing the method 400 of FIG. 4A. Lines 1 through 8 describe the iterations through one or more hint learning epochs for blocks 401 and 402, where intermediate layer outputs from the teacher models are used to compute hint losses, and perturbed hint loss is used to update the training parameters of the student model using backpropagation. Lines 9 through 16 describe the iterations through one or more distillation learning epochs for blocks 403 and 404, where prediction layer outputs from the teacher models are used to compute distillation loss, and perturbed distillation loss is used to update the training parameters of the student model using backpropagation.

It is noted that while in FIG. 4B training parameters (e.g., batch size, threshold bound) have the same value for both intermediate layer learning 401 (including hint learning 402) and prediction layer learning 403 (including distillation learning 404), one or more training parameters (e.g., noise scale, noise distribution, batch size, bound threshold, number of teachers, weighting scheme, etc.) may be configured to have different values for the different types of learning (e.g., hint learning 402 and distillation learning 404) based on required performance (e.g., accuracy, privacy budget). In an example, perturbation for hint learning 402 may use a different noise scale and/or noise distribution than those used for distillation learning 404. In another example, hint learning 402 may use a smaller number of teachers than that of distillation learning 404. In some embodiments, different weighting schemes are used for hint learning and distillation learning. In alternative embodiments, weighting scheme only applies to some of the types of learnings (e.g., one of hint learning and distillation learning), and does not apply to some other types of the learnings (e.g., the other of hint learning and distillation learning).

Figure 5:
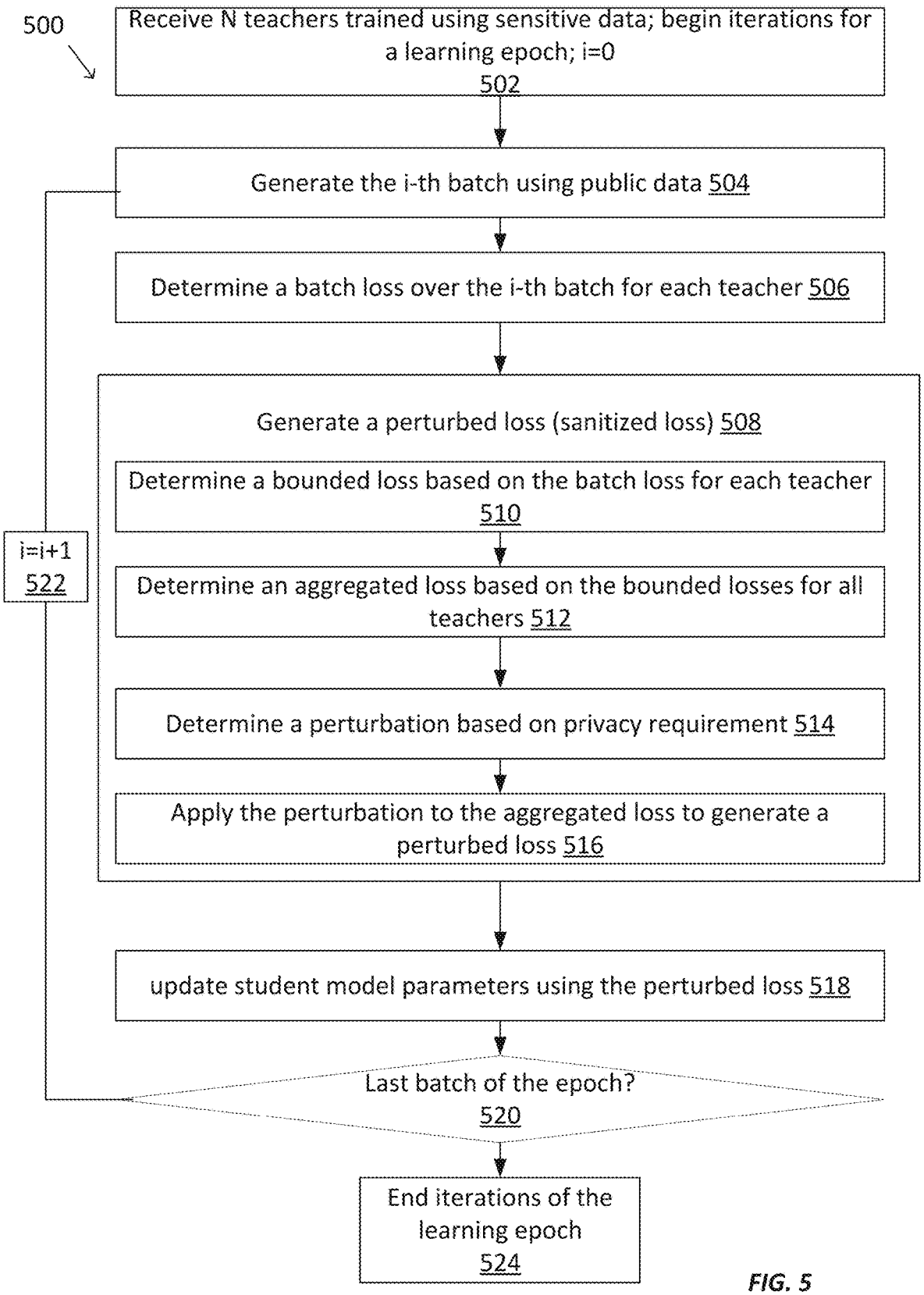
FIG. 5 is a simplified diagram of another method of training a private deep teach-student learning model or a portion thereof according to some embodiments.

Referring to FIG. 5, illustrated is an example method 500 for performing a training epoch (e.g., a hint learning epoch, a distillation learning epoch, etc.) for training a student model using teacher models trained with sensitive data. In an example, the method 500 may be implemented using lines 2-8 or lines 10-16 of algorithm 450 of FIG. 4B.

The method 500 begins at block 502, where a processor receives N teacher models that are trained using sensitive data. The method 500 proceeds to block 504, where the processor generates the i-th batch of training data of a batch size S from the public data. The method 500 proceeds to block 506, where the processor computes a batch loss (e.g., a batch hint loss, a batch distillation loss) for each teacher model using the i-th batch of training data.

The method 500 proceeds to block 508, where a perturbed loss is determined. Block 508 includes processes 510 through 516. At process 510, for each teacher, a bounded loss is determined based on the batch loss. At process 512, an aggregated loss (e.g., using direct average or weighted average) is determined using the bounded losses of all the N teacher models. At process 514, a perturbation (e.g., a noise scale, a noise distribution type, etc.) is determined based on the privacy requirement (e.g., predetermined privacy budget, privacy guarantee level, etc.) and accuracy requirement. At process 516, the perturbation is applied to the aggregated loss to generate a perturbed loss.

The method 500 then proceeds to block 518, where the processor updates the trainable parameters of the student model based on the perturbed loss (e.g., using backpropagation). At block 520, the processor determines whether the present batch is the last batch of training data for the epoch. If at block 520 it is determined that it is not the last batch, the method 500 proceeds to block 522 to increase the batch size by 1, and performs the next batch iteration for the training epoch. If at block 520 it is determined that it is the last batch, the method 500 proceeds to block 524 to end iterations of the learning epoch.

Referring to FIG. 6, illustrated is the performance comparison of various deep neural network models on three well-known image datasets: Canadian Institute For Advanced Research (CIFAR-10), Street View House Numbers (SVHN), and Modified National Institute of Standards and Technology database (MNIST). As shown in FIG. 6, in each of the datasets CIFAR-10, SVHN, and MNIST, PET-DL with n=2 (row 608), PET-DL with n=4 (row 610) and PET-DL-weighted with n=4 (row 612) outperform other approaches (e.g., DP-SGD in row 602, Private Aggregation of Teacher Ensembles (PATE) in row 604, and scale PATE in row 606) for preserving privacy on both privacy budget and accuracy. Specifically, DP-SGD uses the noisy loss for optimization, and PATE and scale PATE approaches add perturbation on the voting strategy. It is noted that in the embodiments of FIG. 6, the teachers are trained with balanced datasets, where the training data is equally split into subsets (e.g., n=2 or 4) for each teacher, where each teacher is good at label prediction for all labels.

Referring to FIG. 7, illustrated is the performance comparison of PET-DL with n=10 without weighting (row 702)

and PET-DL with n=10 with weighting (row 704) on unbalanced dataset on CIFAR-10, SVHN, and MNIST. In these embodiments, ten teachers are trained, and each teacher is only good at one label prediction of the 10 labels. As such, the teachers are class unbalanced. The sensitive training dataset for the teachers is partitioned into 10 subsets. In each subset, 95% data corresponds to only one specific label of the 10 labels, and the reset 5% data uniformly corresponds to the rest nine labels. The ten teachers are trained on the ten subsets respectively, which makes each teacher only very good at one label prediction.

As shown in FIG. 7, PET-DL with weighted learning (in row 704) is more robust comparing to the PET-DL approach without weighted learning (in row 702). Compared to FIG. 6, for a more complex dataset (e.g., CIFAR 10 is more complex than SVHN, which is more complex than MNSIT), the performance of the student model drops more with unbalanced teachers because of the lower performance for each teacher. Furthermore, compared to Table 6, privacy budget is much lower as the number of teachers increase (e.g., from 4 to 10). As such, in one example, in PET-DL (with or without weight), as many as teachers are trained until the student model performance drops.

In various embodiments, the performance (e.g., accuracy) of the trained student model of the PET-DL (with and without weight) systems may be affected by various parameters of the system, including e.g., privacy budget, epoch for hint learning, epoch for distillation learning, batch size for student training, number of teachers, noise scale, compression rate, etc. As such, those parameters may be adjusted based on the performance requirements and the different datasets.

Regarding the privacy budget parameter, in various embodiments, a larger privacy budget increases the accuracy of the trained student model.

Regarding the hint learning epoch parameter, hint learning epoch may be adjusted based on the different datasets to achieve the optimal performance. For example, while there is no hint learning (e.g., hint learning epoch is zero), the accuracy of student model is determined by the distillation learning, and a small value of distillation learning epoch may significantly deteriorates the student's performance. However, such performance deterioration may be mitigated by the hint learning, even with a small value of hint learning epoch. For example, when hint learning epoch Th is 10, the performance difference between distillation learning epoch Td=72 and Td=120 is negligible. As such, hint learning, even with a small hint learning epoch (e.g., about 10), improve the student's performance with little privacy loss. The number of hint learning epoch may be adjusted based on the different datasets.

Regarding the distillation learning epoch parameter, a larger distillation learning epoch improves the performance of the student model because of more private knowledge transfer responded by those teachers.

Regarding the batch size parameter, the performance of student ascends with a smaller batch size for student training. On the other hand, a larger value of batch size leads to less times query requests from the student model, and thus the privacy is better protected. The batch size may be determined to balance the accuracy/effectiveness and the privacy. In an example, the batch size is set as 128 on CIFAR-10.

Regarding the noise scale parameter, a larger noise scale may protect the data with better privacy, but also decreases the performance in general. However, because a neural network or other machine learning techniques frequently suffers from the overfitting problem, the bound and additional noise may act as regularization roles during training. Compared with CIFAR-10, the other two datasets are not very sensitive to the noise scale. As such, in some examples, a large value (e.g., greater than 15%) of noise scale for privacy preserving may be used.

Regarding the compression rate parameter, the teacher student model could support using a large teacher to train a small student. The student's performance rises with a larger size of the neural network. A student model with a very large size of neural network, however, requires more public data and more queries for a stable and effect model.

Various embodiments of the PET-DL (with or without weight) systems provide privacy guarantee under the privacy analysis. The sensitive data of multiple teachers are considered as a sensitive data pool. To enforce privacy guarantee over the sensitive data pool, the information related with the sensitive data is perturbed by random noise during training the student model, i.e., the knowledge distillation loss and the hint loss. To provide a stronger privacy protection in the training process, various techniques (e.g., batch loss optimization, weighted knowledge transfer via teachers) of privacy learning of PET-DL help to reduce privacy cost during training. The privacy analysis may be performed based on differential privacy. Differential privacy constitutes a strong standard that provides privacy guarantees for machine learning algorithms, by limiting the range of the output distribution of an algorithm facing small perturbations on its inputs. A general method for enforcing a deterministic function f with differential privacy is to add random noise calibrated to the sensitivity of the function f. In an example, a Gaussian noise is added (e.g., as shown in equations 4.1 and 4.2), where the noise scale is chosen based on the sensitivity of the function f, such that differential privacy is guaranteed. As shown in equation 4.2, in embodiments where teachers' training data are disjoint with each other, the sensitivity of $\hat{\mathcal{L}}^{(t)}$ is B/N, where B is the threshold and N is the number of teachers. As such, each query is differentially private when the noise scale is set to a proper value based on the sensitivity.

In some embodiments, batch loss optimization in PET-DL is used to reduce privacy cost during training of the student model. Because each query will expose some privacy information from teacher to student, to provide stronger privacy protection, the batch loss optimization is performed such that the student model sends a batch set of samples as a query to the teacher models. As such, the number of queries is reduced compared to the case where the student model sends an individual sample as a query to the teacher models. All teacher models may transfer their ensemble knowledge with carefully perturbed random noise for privacy. By reducing the number of queries during the training of the student model, the privacy loss is reduced.

In some embodiments, weighted knowledge transfer via teachers in PET-DL is used to reduce privacy cost during training of the student model. Rather than the directly loss aggregation among teachers, each teacher may use additional information such as confidence score to weight its response before the aggregation. In some examples, the highest probability among different classes is used as the confidence score, and the aggregated loss may be calculated based on the confidence score. The privacy loss of each query is the same as that of average aggregation.

Some examples of computing devices, such as computing device 100 may include non-transitory, tangible, machine readable media that include executable code that when run by one or more processors (e.g., processor 110) may cause the one or more processors to perform the processes of methods 200, 300, 350, 400, 450, and 500. Some common forms of machine readable media that may include the processes of methods 200, 300, 350, 400, 450, and 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for training parameters of a student model, comprising:
   receiving one or more teacher models trained using a first training set including sensitive data samples,
      wherein each teacher model includes one or more intermediate layers and a prediction layer coupled to the one or more intermediate layers;
   receiving, from the one or more teacher models, one or more intermediate layer outputs and one or more prediction layer outputs respectively based on public data samples of a second training set; and
   performing student model training to train parameters of the student model based on a first loss,
      wherein the first loss is determined based on a first output of the student model based on the public data samples and the corresponding intermediate layer outputs and prediction layer outputs of the one or more teacher models.

2. The method of claim 1,
   wherein the first output of the student model is one of an intermediate layer output of the student model and a prediction layer output of the student model.

3. The method of claim 2, wherein the determining the first loss includes:
   determining an individual loss associated with each teacher model based on the first output of the student model;
   determining a bounded loss for each individual loss;
   generating an aggregated loss based on the bounded losses of the one or more teacher models; and
   applying a noise to the aggregated loss to generate the first loss.

4. The method of claim 3, wherein the generating the aggregated loss includes:
   applying weights to the bounded losses of the one or more teacher models; and
   generating the aggregated loss using an average of the weighted bounded losses.

5. The method of claim 4, wherein the generating the aggregated loss includes:
   generating the weights based on confidence scores of the corresponding teacher models.

6. The method of claim 2, wherein the student model training includes:
   determining a second loss based on a second output of the student model based on the public data and the corresponding output of the one or more teacher models,
      wherein the second output is the other of the intermediate layer output of the student model and the prediction layer output of the student model; and
   training parameters of the student model based on the second loss.

7. The method of claim 6, wherein one of the first and second losses is an L2 loss, and the other of the first and second losses is a softened cross entropy loss.

8. A non-transitory machine-readable medium comprising a plurality of machine-readable instructions which, when executed by one or more processors, are adapted to cause the one or more processors to perform a method comprising:
   receiving one or more teacher models trained using a first training set including sensitive data samples,
      wherein each teacher model includes one or more intermediate layers and a prediction layer coupled to the one or more intermediate layers;
   receiving, from the one or more teacher models, one or more intermediate layer outputs and one or more prediction layer outputs respectively based on public data samples of a second training set; and
   performing student model training to train parameters of the student model based on a first loss,
      wherein the first loss is determined based on a first output of the student model based on the public data samples and the corresponding intermediate layer outputs and prediction layer outputs of the one or more teacher models.

9. The non-transitory machine-readable medium of claim 8,
   wherein the first output of the student model is one of an intermediate layer output of the student model and a prediction layer output of the student model; and training parameters of the student model based on the first loss.

10. The non-transitory machine-readable medium of claim 9, wherein the determining the first loss includes:

determining an individual loss associated with each teacher model based on the first output of the student model;

determining a bounded loss for each individual loss;

generating an aggregated loss based on the bounded losses of the one or more teacher models; and applying a noise to the aggregated loss to generate the first loss.

11. The non-transitory machine-readable medium of claim 10, wherein the generating the aggregated loss includes:

applying weights to the bounded losses of the one or more teacher models; and generating the aggregated loss using an average of the weighted bounded losses.

12. The non-transitory machine-readable medium of claim 11, wherein the generating the aggregated loss includes:

generating the weights based on confidence scores of the corresponding teacher models.

13. The non-transitory machine-readable medium of claim 9, wherein the student model training includes:

determining a second loss based on a second output of the student model based on the public data and the corresponding output of the one or more teacher models, wherein the second output is the other of the intermediate layer output of the student model and the prediction layer output of the student model; and training parameters of the student model based on the second loss.

14. The non-transitory machine-readable medium of claim 13, wherein one of the first and second losses is an L2 loss, and the other of the first and second losses is a softened cross entropy loss.

15. A system, comprising:

a non-transitory memory; and one or more hardware processors coupled to the non-transitory memory and configured to read instructions from the non-transitory memory to cause the system to perform a method comprising:

receiving one or more teacher models trained using a first training set including sensitive data samples, wherein each teacher model includes one or more intermediate layers and a prediction layer coupled to the one or more intermediate layers;

receiving, from the one or more teacher models, one or more intermediate layer outputs and one or more prediction layer outputs respectively based on public data samples of a second training set; and performing student model training to train parameters of the student model based on a first loss, wherein the first loss is determined based on a first output of the student model based on the public data samples and the corresponding intermediate layer outputs and prediction layer outputs of the one or more teacher models.

16. The system of claim 15, wherein the first output of the student model is one of an intermediate layer output of the student model and a prediction layer output of the student model; and training parameters of the student model based on the first loss.

17. The system of claim 16, wherein the determining the first loss includes:

determining an individual loss associated with each teacher model based on the first output of the student model;

determining a bounded loss for each individual loss;

generating an aggregated loss based on the bounded losses of the one or more teacher models; and applying a noise to the aggregated loss to generate the first loss.

18. The system of claim 17, wherein the generating the aggregated loss includes:

applying weights to the bounded losses of the one or more teacher models; and generating the aggregated loss using an average of the weighted bounded losses.

19. The system of claim 18, wherein the generating the aggregated loss includes:

generating the weights based on confidence scores of the corresponding teacher models.

20. The system of claim 16, wherein the student model training includes:

determining a second loss based on a second output of the student model based on the public data and the corresponding output of the one or more teacher models, wherein the second output is the other of the intermediate layer output of the student model and the prediction layer output of the student model; and training parameters of the student model based on the second loss.

* * * * *